US012693409B2

(12) United States Patent
Senzaki

(10) Patent No.: US 12,693,409 B2
(45) Date of Patent: Jul. 28, 2026

(54) INFORMATION PROCESSING APPARATUS AND METHOD FOR ACQUIRING ANNOTATION INFORMATION BY CORRECTING SELECTED OBJECT POSITION INFORMATION

(71) Applicant: NEC Corporation, Tokyo (JP)

(72) Inventor: Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 300 days.

(21) Appl. No.: 18/515,684

(22) Filed: Nov. 21, 2023

(65) Prior Publication Data

US 2024/0176013 A1     May 30, 2024

(30) Foreign Application Priority Data

Nov. 29, 2022    (JP) ................................. 2022-189837

(51) Int. Cl.
| | |
|---|---|
| *G01S 13/90* | (2006.01) |
| *G06T 7/20* | (2017.01) |
| *G06T 7/70* | (2017.01) |

(52) U.S. Cl.
CPC ................ *G01S 13/90* (2013.01); *G06T 7/20* (2013.01); *G06T 7/70* (2017.01); *G06T 2207/10032* (2013.01)

(58) Field of Classification Search
CPC ... G01S 13/90; G06T 7/20; G06T 7/70; G06T 2207/10032

(Continued)

(56) References Cited

U.S. PATENT DOCUMENTS

| | | | | |
|---|---|---|---|---|
| 10,830,907 B2 * | 11/2020 | Anderson | .............. | G01C 21/14 |
| 2019/0361116 A1 * | 11/2019 | Lee | ........... | G08G 3/02 |

(Continued)

FOREIGN PATENT DOCUMENTS

| | | | | |
|---|---|---|---|---|
| CN | 110544273 A | * 12/2019 | .............. | G06T 7/70 |
| JP | 2012-063186 A | 3/2012 | | |

(Continued)

OTHER PUBLICATIONS

Greidanus, Harm, et al. "The SUMO ship detector algorithm for satellite radar images." Remote Sensing 9.3 (2017): 246. (Year: 2017).*

(Continued)

*Primary Examiner* — Henok Shiferaw
*Assistant Examiner* — Urooj Fatima
(74) *Attorney, Agent, or Firm* — Sughrue Mion, P.LLC

(57) ABSTRACT

An acquisition unit acquires a target image including a plurality of target objects, object position information, and object-related information. The object-related information to be acquired by the acquisition unit includes at least one of a generation time of the object position information acquired by the acquisition unit and a speed of the target object. A generation unit generates reliability information of the object position information by use of at least the object-related information. A selection unit selects one or more pieces of the object position information by use of the reliability information. A correction data acquisition unit acquires correction data of the object position information regarding each of the one or more pieces of the selected object position information. A correction unit corrects the plurality of the object position information by use of one or more pieces of the acquired correction data.

16 Claims, 13 Drawing Sheets

(58) Field of Classification Search
USPC .................... 701/21, 300, 519; 382/291, 282
See application file for complete search history.

(56) References Cited

U.S. PATENT DOCUMENTS

| | | | | | |
|---|---|---|---|---|---|
| 2020/0126239 A1* | 4/2020 | Qian | ........................ | G06T 7/20 |
| 2021/0048503 A1* | 2/2021 | Ljung | ................... | G01S 5/0236 |

FOREIGN PATENT DOCUMENTS

| | | | | |
|---|---|---|---|---|
| JP | 5545740 B2 * | 7/2014 |
| JP | 2019-164464 A | 9/2019 |

OTHER PUBLICATIONS

Zollmann, Stefanie, et al. "Augmented reality for construction site monitoring and documentation." Proceedings of the IEEE 102.2 (2014): 137-154. (Year: 2014).*

Lee, Won-Jae, et al. "Detection and tracking for the awareness of surroundings of a ship based on deep learning." Journal of Computational Design and Engineering 8.5 (2021): 1407-1430. (Year: 2021).*

* cited by examiner

SUPERPOSE
POLYGON

TARGET OBJECT

POLYGON

FIG. 4

| OBJECT INFORMATION | | | |
| --- | --- | --- | --- |
| OBJECT-RELATED INFORMATION | | | OBJECT POSITION INFORMATION |
| GENERATION TIME | IDENTIFICATION INFORMATION | SPEED (knot) | POSITION |
| 2022.11.04 09:09:03 | #03049 | xx.x | aa° aa′ N<br>bbb° bb′ E |
| 2022.11.04 09:11:24 | #94056 | yy.y | cc° cc′ N<br>ddd° dd′ E |
| 2022.11.04 09:12:18 | #58372 | zz.z | ee° ee′ N<br>fff° ff′ E |
| ⋮ | ⋮ | ⋮ | ⋮ |

COMPLETION
COUNT:　　　1 / 5
SHIFT
　　　x: 10.35  y: 23.45

PLEASE MOVE POLYGON IN SUCH WAY AS
TO LAY POLYGON OVER NEARBY VESSEL.

NEXT　　END

INFORMATION PROCESSING APPARATUS AND METHOD FOR ACQUIRING ANNOTATION INFORMATION BY CORRECTING SELECTED OBJECT POSITION INFORMATION

This application is based upon and claims the benefit of priority from Japanese patent application No. 2022-189837, filed on Nov. 29, 2022, the disclosure of which is incorporated herein in its entirety by reference.

BACKGROUND

Technical Field

The present invention relates to an information processing apparatus, an information processing method, and a program.

Background Art

In a process of an analysis or the like of a satellite image or the like, detection of an object included in the image may be performed. Such detection can be executed by utilizing a machine-learned detection model. Herein, performing learning by use of many pieces of training data can heighten accuracy of a detection model.

However, in order to prepare training data, it is necessary to perform work, so-called annotation, of giving information of an object to an image, and effort is required.

Patent Document 1 (Japanese Patent Application Publication No. 2012-63186) describes that an image information computation unit of a moving body determination apparatus determines a position of a moving body included in a synthetic aperture radar (SAR) image. Moreover, Patent Document 1 describes that association of the moving body with a moving body that has transmitted transmission information is performed.

Patent Document 2 (Japanese Patent Application Publication No. 2019-164464) describes that positional information of a moveable monitoring target object existing in a target range is determined by analyzing an image captured by an image capturing unit.

SUMMARY

Techniques described in Patent Documents 1 and 2 described above have a problem that, since a position of a target object is determined by an information analysis of an image, positional accuracy of the target object depends on the analysis. For example, even when machine learning is performed by use of annotation information acquired by the information analyses, it is difficult to acquire a detection model with higher accuracy than detection accuracy in the information analyses.

In view of the problem described above, one example of an object of the present invention is to provide an information processing apparatus, an information processing method, and a program that can easily acquire annotation information with high accuracy.

According to one aspect of the present invention, there is provided an information processing apparatus including:

at least one memory configured to store instructions; and at least one processor configured to execute the instructions to perform operations including:

acquiring a target image including a plurality of target objects, object position information being information indicating a position of each of the plurality of target objects and being selected by use of an image capturing time of the target image, and object-related information including at least one of a generation time of the object position information and a speed of the target object;

generating reliability information of the object position information by use of at least the object-related information;

selecting one or more pieces of the object position information by use of the reliability information among a plurality of pieces of the acquired object position information;

acquiring correction data of the object position information regarding each of the one or more pieces of the selected object position information; and correcting the plurality of the object position information by use of one or more pieces of the acquired correction data.

According to one aspect of the present invention, there is provided an information processing method executed by one or more computers, the information processing method including:

acquiring a target image including a plurality of target objects, object position information being information indicating a position of each of the plurality of target objects and being selected by use of an image capturing time of the target image, and object-related information including at least one of a generation time of the object position information and a speed of the target object;

generating reliability information of the object position information by use of at least the object-related information;

selecting one or more pieces of the object position information by use of the reliability information among a plurality of pieces of the acquired object position information;

acquiring correction data of the object position information regarding each of the one or more pieces of the selected object position information; and correcting the plurality of the object position information by use of one or more pieces of the acquired correction data.

According to one aspect of the present invention, there is provided a non-transitory storage medium storing a program causing a computer to execute an information processing method, the information processing method including:

acquiring a target image including a plurality of target objects, object position information being information indicating a position of each of the plurality of target objects and being selected by use of an image capturing time of the target image, and object-related information including at least one of a generation time of the object position information and a speed of the target object;

generating reliability information of the object position information by use of at least the object-related information;

selecting one or more pieces of the object position information by use of the reliability information among a plurality of pieces of the acquired object position information;

acquiring correction data of the object position information regarding each of the one or more pieces of the selected object position information; and correcting the plurality of the object position information by use of one or more pieces of the acquired correction data.

According to one aspect of the present invention, an information processing apparatus, an information processing method, and a program that can easily acquire annotation information with high accuracy can be acquired.

BRIEF DESCRIPTION OF THE DRAWINGS

The above and other objects, advantages and features of the present invention will be more apparent from the following description of certain preferred example embodiments taken in conjunction with the accompanying drawings, in which:

FIG. 4 is a diagram illustrating configurations of object position information and object-related information.

EXAMPLE EMBODIMENT

The invention will be now described herein with reference to illustrative example embodiments. Those skilled in the art will recognize that many alternative example embodiments can be accomplished using the teachings of the present invention and that the invention is not limited to the example embodiments illustrated for explanatory purposes.

Hereinafter, example embodiments of the present invention are described by use of the drawings. Note that, in all of the drawings, a similar component is assigned with a similar reference sign, and description thereof is not repeated as appropriate.

First Example Embodiment

Figure 1:
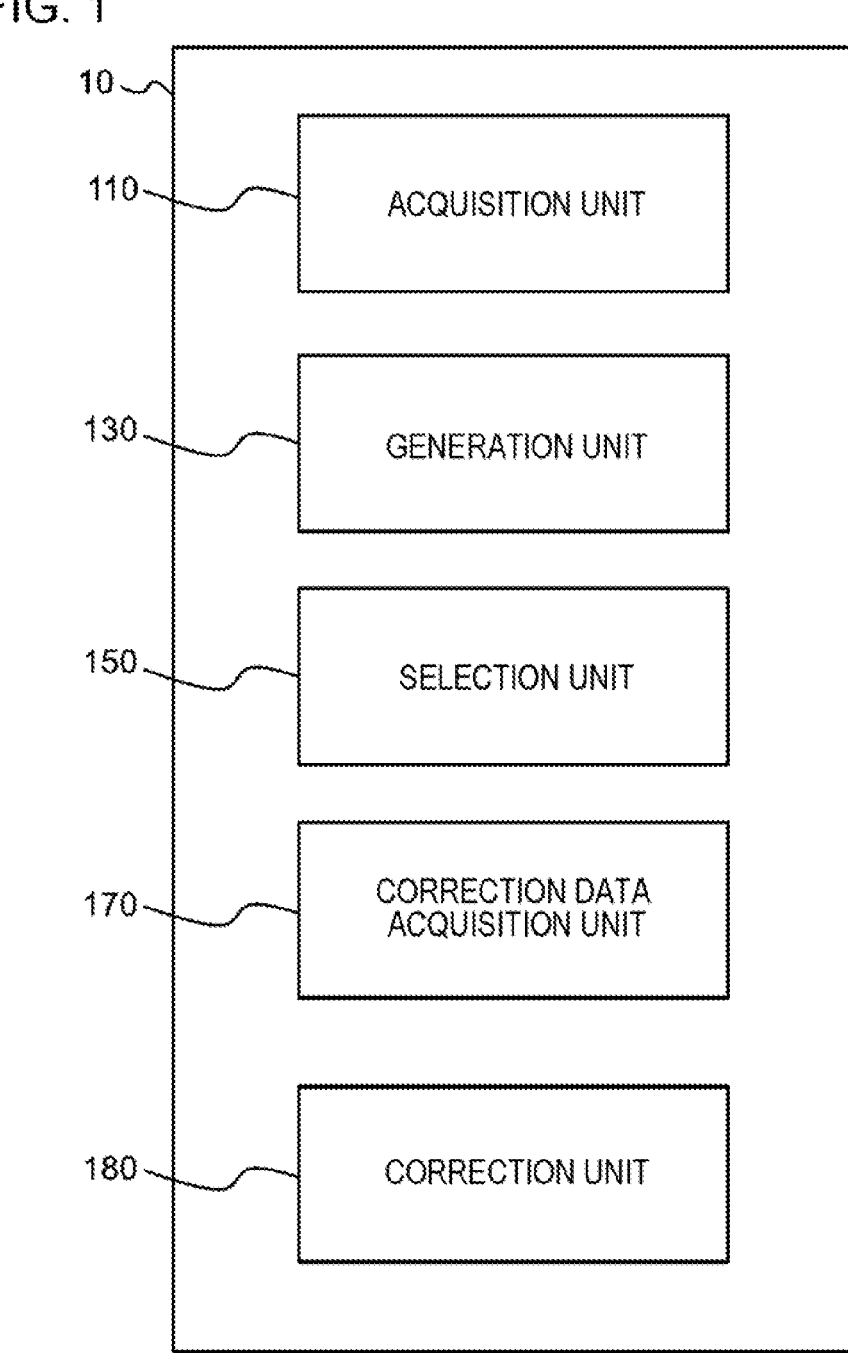
FIG. 1 is a diagram illustrating an outline of an information processing apparatus according to a first example embodiment.

FIG. 1 is a diagram illustrating an outline of an information processing apparatus 10 according to a first example embodiment. The information processing apparatus 10 includes an acquisition unit 110, a generation unit 130, a selection unit 150, a correction data acquisition unit 170, and a correction unit 180. The acquisition unit 110 acquires a target image including a plurality of target objects, object position information, and object-related information. The object position information acquired by the acquisition unit 110 is information being information indicating a position of each of the plurality of target objects and being selected by use of an image capturing time of the target image. The object-related information to be acquired by the acquisition unit 110 includes at least one of a generation time of the object position information acquired by the acquisition unit 110 and a speed of the target object. The generation unit 130 generates reliability information of the object position information by use of at least the object-related information. The selection unit 150 selects one or more pieces of the object position information by use of the reliability information among a plurality of pieces of the acquired object position information. The correction data acquisition unit 170 acquires correction data of the object position information regarding each of the one or more pieces of the selected object position information. The correction unit 180 corrects the plurality of the object position information by use of one or more pieces of the acquired correction data.

According to the information processing apparatus 10, annotation information with high accuracy can be easily acquired.

A detailed example of the information processing apparatus 10 is described below.

In the present example embodiment, the target image to be acquired by the acquisition unit 110 is, for example, a satellite image. A type of a target image to be acquired by the acquisition unit 110 is not particularly limited, but a target image is, for example, an optical image or an SAR image. For example, information indicating an image capturing time of a target image is associated with the target image.

Moreover, information indicating a position and a range of a captured region is associated with a target image. Information indicating a position and a range of a region can be, for example, a combination of latitude and longitude of a position corresponding to a criterion point of the region, and information indicating extent of the region. A criterion point of a region is, for example, a central point of the region. As another example, information indicating a position and a range of a region may be latitude and longitude of a position corresponding to each vertex of an outer edge of the region. It can be determined, by use of information indicating a position and a range of a region, which region of map information is captured to acquire the target image.

A target object is not particularly limited, but is, for example, a moving body. Examples of a moving body include, a vessel, a vehicle, a flying body, a living body, and the like. An example in which a target object is a vessel is described below.

A target image to be acquired by the acquisition unit 110 includes a plurality of target objects. For example, a target image is an image acquired by capturing a sea, and the target image includes a plurality of vessels floating on the sea.

A target object transmits information relating to the target object at a predetermined period or a predetermined timing. For example, transmission and reception of information relating to a target object are performed between target objects or between a target object and a base station on land. When a target object is a vessel, information relating to the target object is, for example, information transmitted and received in an automatic identification system (AIS).

Information relating to a target object can include, for example, information indicating identification information, a type, a position, an orientation, a speed, a movement state, a size, a position of an antenna, a destination, and the like, relating to the target object. Moreover, information relating to a target object includes a time at which the information is transmitted.

Annotation is a process of giving, to a target image, information of each target object included in the target image. For example, as one example, annotation is performed as follows. A person performs an operation of laying a figure (polygon) corresponding to the target image over a target image displayed on a display. One figure is drawn for one target object. Accordingly, a position, an orientation, and a size of a figure are stored as information indicating a position, an orientation, and a size of one target object included in the target image, respectively. A similar operation is performed regarding each of all target objects included in a target image.

By performing such annotation, a target image is given information indicating a position, an orientation, and a size of each of a plurality of target objects included in the target image. However, information given by annotation may only indicate at least a position of a target object. Information given by annotation may include no information indicating an orientation and a size of a target object. Information of a target object given to a target image, for example, information given by such annotation is hereinafter referred to as "annotation information".

A target image, and annotation information given to the target image can be used as training data, when machine learning is executed for, for example, a detection model that detects a target object from a target image. In order to heighten detection accuracy of a detection model, it is preferable to prepare a plurality of pieces of such annotation information. Moreover, it is preferable to prepare annotation information with high accuracy.

Figure 2:
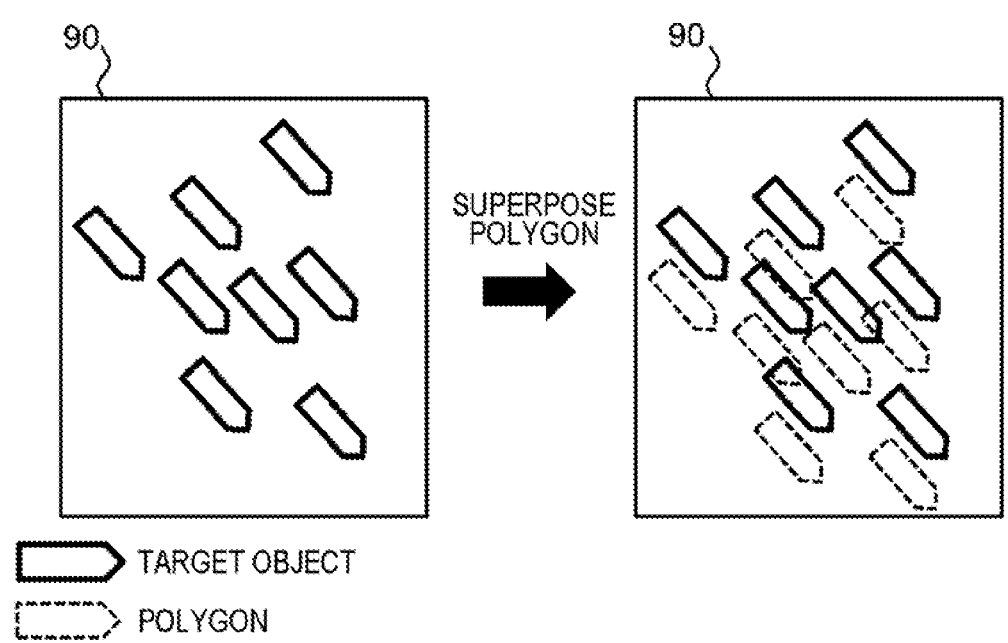
FIG. 2 is a diagram for describing an example of annotation.

FIG. 2 is a diagram for further describing an example of annotation. It is assumed to be known which region on a map is captured to acquire a target image 90. Then, at a time point when the target image 90 is captured, it is possible to automatically superpose, based on positional information transmitted by a target object located within the region, a polygon indicating a target object on the target image 90. The superposed polygon ideally overlaps the target object within the target image 90. However, actually, a polygon often does not overlap completely a target object within the target image 90 due to an error or the like of positional information of the target image 90. Particularly in an image of a sea, no structure or the like serving as a mark exists, and, therefore, automatic correction or the like is difficult. When a polygon does not overlap a target object, it is necessary that a person correct (modify) positions of all polygons one by one in order to acquire correct annotation information. Such correction much requires labor and time.

The information processing apparatus 10 according to the present example embodiment can help annotation work. Specifically, the information processing apparatus 10 corrects a position of another polygon, based on a result of correcting positions of some of polygons. Processing performed by the information processing apparatus 10 is described in detail below.

Figure 3:
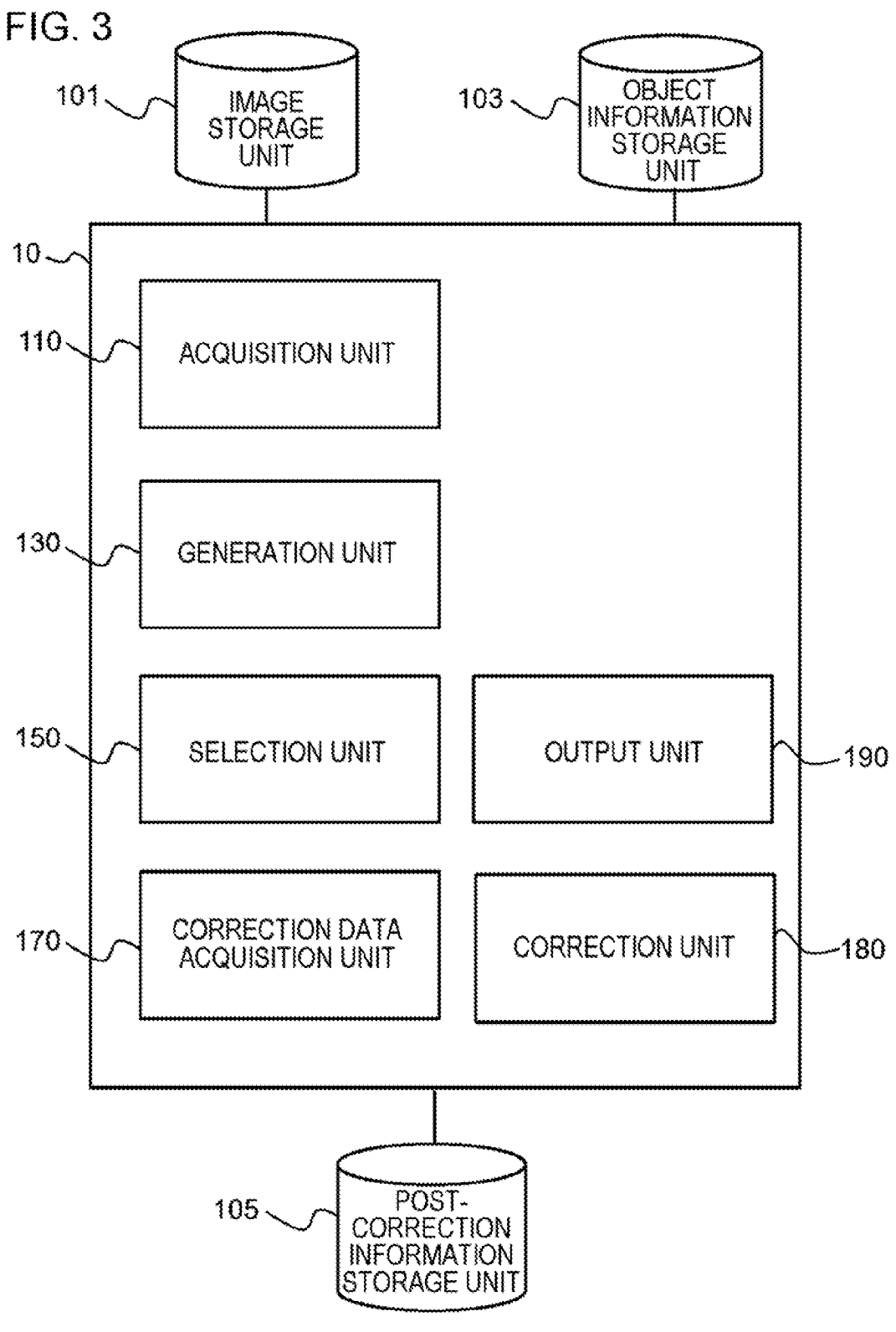
FIG. 3 is a diagram illustrating a functional configuration of the information processing apparatus according to the first example embodiment.

FIG. 3 is a diagram illustrating a functional configuration of the information processing apparatus 10 according to the present example embodiment. In the example of the present figure, the information processing apparatus 10 further includes an output unit 190.

The acquisition unit 110 acquires a target image including a plurality of target objects. The target image is a target of annotation. For example, a target image is previously held in an image storage unit 101, and the acquisition unit 110 can read and acquire the target image from the image storage unit 101. The image storage unit 101 may be included in the information processing apparatus 10, or may be provided outside the information processing apparatus 10. As another example, the acquisition unit 110 may acquire a target image from an apparatus different from the information processing apparatus 10. The acquisition unit 110 may collectively acquire a plurality of target images, or may acquire target images one by one. As described above, a target image is associated with an image capturing time, and information indicating a position and a range of a captured region, and the acquisition unit 110 can acquire the pieces of information together.

The number of target objects included in each target image is not particularly limited, but is, for example, 100 or more.

The acquisition unit 110 also acquires object position information and object-related information. As described above, the object-related information includes at least one of a generation time of object position information and a speed of a target object. The object position information and the object-related information are included in, for example, "information relating to a target object" described above. The object position information and the object-related information can be information transmitted from a target object. Object position information and object-related information received by a base station or the like are held in, for example, an object information storage unit 103 in a state being associated with each other. The acquisition unit 110 can read and acquire object position information and object-related information from the object information storage unit 103. The object information storage unit 103 may be included in the information processing apparatus 10, or may be provided outside the information processing apparatus 10.

FIG. 4 is a diagram illustrating configurations of object position information and object-related information. Although FIG. 4 illustrates an example in which object-related information includes a generation time of object position information, identification information, and a speed, a configuration of object-related information is not limited to the present example. A combination of object position information and object-related information is hereinafter referred to as "object information". The object information storage unit 103 holds a plurality of pieces of object information. A plurality of pieces of object information held in the object information storage unit 103 can include pieces of object information having pieces of identification information different from each other. Moreover, a plurality of pieces of object information held in the object information storage unit 103 can include pieces of object information having generation times of pieces of object position information different from each other.

Herein, object position information to be acquired by the acquisition unit 110 is information selected by use of an image capturing time of a target image. For example, the object information storage unit 103 holds a plurality of pieces of object position information having generation times different from each other, regarding the same target object (identification information). Among the plurality of pieces of object position information, the acquisition unit 110 selects and acquires object information having a generation time closest to an image capturing time of a target image. Thereby, the acquisition unit 110 acquires one piece of object position information for each target object (identification information). Moreover, the acquisition unit 110 acquires object-related information being associated with the selected object position information.

Note that, selection of object position information to be acquired by the acquisition unit 110 may be performed by the acquisition unit 110, or may not be performed by the acquisition unit 110. For example, the object information storage unit 103 may hold object position information previously selected by a similar method, or the acquisition unit 110 may acquire object position information selected by other than the information processing apparatus 10 by a similar method.

Moreover, the acquisition unit 110 may extract and acquire, based on information indicating a position and a range of a region captured in a target image, only object position information indicating positions within and around the region.

When object position information is generated and then quickly transmitted from target object, a transmission time of the object position information may be regarded as a generation time of the object position information.

The number of pieces of object position information to be acquired by the acquisition unit 110 may not be the same as the number of target objects included in a target image. For example, not all of a plurality of captured target objects transmit object information. When a plurality of captured target objects include a target object that has not transmitted object information, the number of pieces of object position information to be acquired by the acquisition unit 110 can be less than the number of target objects included in a target image. On the other hand, considering that positional information of a target image includes an error, the acquisition unit 110 may acquire object position information of a target object located not only within a region in which the target image has been captured, but also around the region (e.g. a distance from the region is within a predetermined criterion). In this case, the number of pieces of object position information to be acquired by the acquisition unit 110 can become more than the number of target objects included in the target image.

Although the example in which the acquisition unit 110 acquires object position information and object-related information from the object information storage unit 103 is described above, the acquisition unit 110 may acquire object position information and object-related information from other than the object information storage unit 103.

Moreover, object position information and object-related information are not limited to information transmitted from a target object, and may be information measured by another method. However, object position information to be acquired by the acquisition unit 110 is preferably information generated without using a target image acquired by the acquisition unit 110.

The acquisition unit 110 may convert acquired object position information into positional information to a target image. In other words, the acquisition unit 110 may convert acquired object position information into a coordinate system in which a predetermined position (e.g. a center or one of vertexes) of a target image is set as a criterion. Then, processing by the generation unit 130 or the like may be performed for object position information after conversion.

The generation unit 130 generates reliability information of the object position information by use of at least the object-related information. Reliability information is information indicating highness of a possibility that a target object is located at a position indicated by object position information during capturing of a target image. As a possibility that a target object is located at a position indicated by object position information during capturing of a target image is higher, reliability information indicates higher reliability. In the present example embodiment, an example in which object-related information includes a speed of a target object, and the generation unit 130 generates reliability information by use of the speed of the target object is described. The generation unit 130 according to the present example does not need to use a generation time of object position information for generation of reliability information.

The generation unit 130 according to the present example embodiment computes, as reliability information, a reliability degree $c_i$ (i=1, 2, . . . , n) for a plurality of pieces of object position information, by use of, for example, Equation (1). i is a number of identifying object position information. In other words, i can also be said to be a number by which the acquisition unit 110 identifies a target object corresponding to the object position information. n is a natural number, and is the number of pieces of object position information acquired by the acquisition unit 110 in relation to the target image. Hereinafter, object position information that the acquisition unit 110 has acquired regarding the target object i is also referred to as object position information $P_i$.

[Mathematical 1]

$$c_i = \frac{1}{1 + S_i} \tag{1}$$

A speed $S_i$ that the generation unit 130 according to the present example embodiment uses for generation of reliability information for the object position information $P_i$ is a speed of a target object at a generation time $T_i$ of the object position information $P_i$. In other words, the speed $S_i$ is a speed of the target object i at a time point when the object position information $P_i$ is generated in the target object i. Alternatively, the speed $S_i$ that the generation unit 130 uses for generation of reliability information may be, for example, a speed of a target object at a time point when the object position information $P_i$ is transmitted from the target object. The speed $S_i$ and the object position information $P_i$ are included in the same object information. In other words, when a target object transmits object information, the speed $S_i$ and the object position information $P_i$ are transmitted at the same timing.

Note that, the generation unit 130 may generate reliability information by use of a mathematical expression different from Equation (1) or a rule. However, the generation unit 130 preferably generates reliability information in such a way that reliability becomes higher as the speed $S_i$ is slower. In other words, when the target object i is stopped at the generation time $T_i$ of the object position information $P_i$, a reliability degree of the object position information $P_i$ becomes the highest. An image capturing time of a target image is not necessarily the same as the generation time $T_i$ of the object position information $P_i$. It is because, herein, a possibility that a target object is at a position indicated by the object position information $P_i$ at an image capturing time of a target image is estimated to be higher as the speed $S_i$ is slower.

After the generation unit 130 generates reliability information regarding all pieces of the object position information $P_i$, the selection unit 150 selects one or more pieces of the object position information by use of reliability information among a plurality of pieces of acquired object position information. Specifically, the selection unit 150 selects, in descending order of reliability indicated by reliability information, a predetermined number of object position information among a plurality of pieces of the object position information $P_i$ (i=1, 2, . . . , n) acquired by the acquisition unit 110. The predetermined number is, for example, equal to or more than 1, preferably, equal to or more than 2. The predetermined number is, for example, equal to or less than 5, preferably, equal to or less than 3.

The correction data acquisition unit 170 acquires correction data of the object position information regarding each of the one or more pieces of the selected object position information. A method by which the correction data acquisition unit 170 acquires correction data is described below in detail.

The output unit 190 displays, for example, a figure illustrating object position information over a target image. The output unit 190 can display a figure illustrating object position information and a target image on a display by outputting display data to the display connected to the information processing apparatus 10.

Figure 5:
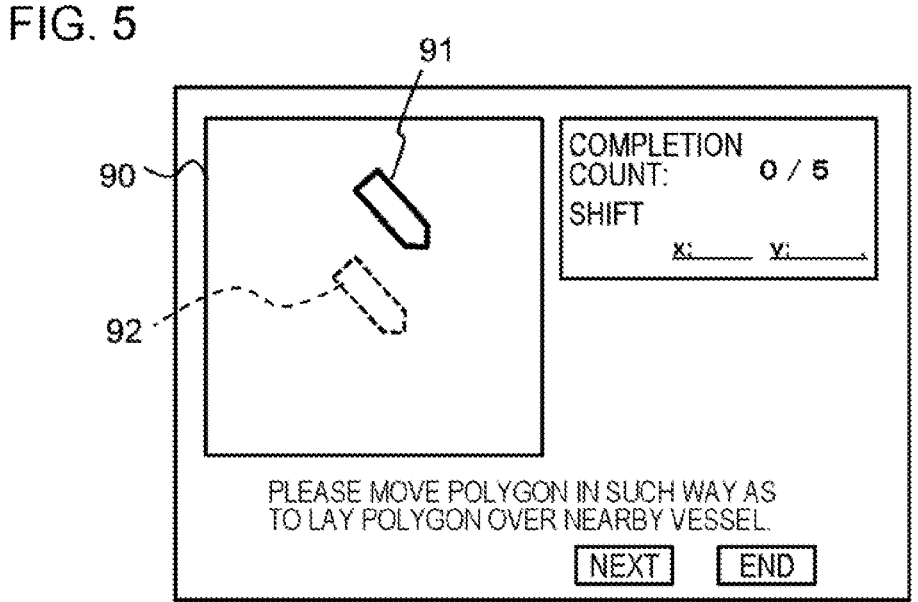
FIG. 5 is a diagram illustrating an example of an image displayed by an output unit.
Figure 6:
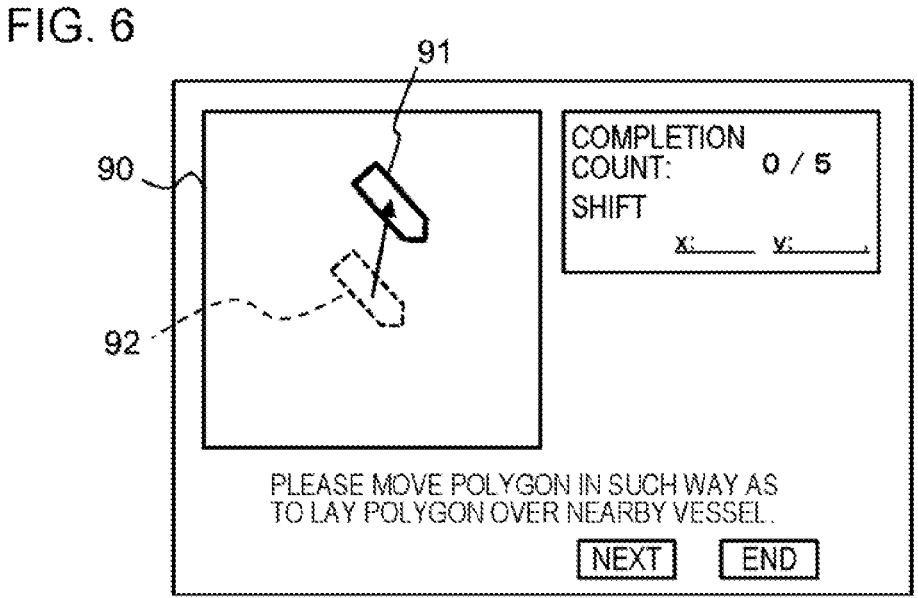
FIG. 6 is a diagram illustrating a scene of operation of a user.
Figure 7:
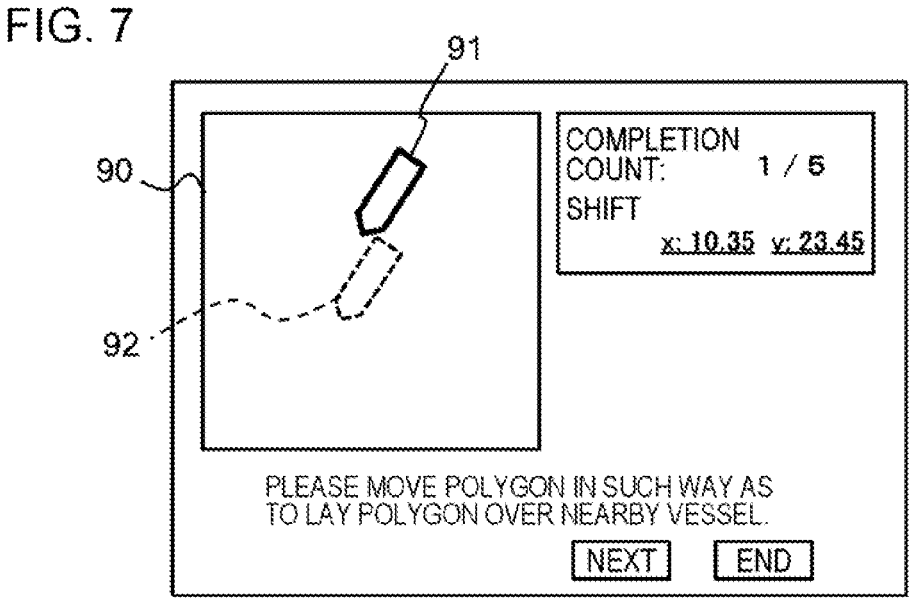
FIG. 7 is a diagram illustrating an example of an image displayed by the output unit.

FIGS. 5 to 7 are diagrams each illustrating an example of an image displayed by the output unit 190. Regarding one or more pieces of object position information selected by the selection unit 150, the output unit 190 displays a figure 92 illustrating a target object over the target image 90 by use of object position information. Moreover, the output unit 190 performs output for promoting correction of object position information. The correction data acquisition unit 170 can acquire correction data, based on correction performed according to the output for promoting correction.

FIGS. 5 to 7 illustrate a flow when pieces of selected object position information are processed one by one.

The output unit 190 determines a positional relationship between the target image 90 and the figure 92 to be displayed, based on object position information for the figure 92, and information indicating a position of a region captured in the target image 90.

Moreover, in the example of FIGS. 5 to 7, object-related information further includes an orientation of a target object, and the output unit 190 determines an orientation of the displayed figure 92 to be laid over the target image 90, based on the orientation of the target object indicated by the object-related information. Moreover, when object-related information to be acquired by the acquisition unit 110 includes information indicating a size of a target object, the output unit 190 may determine a size of the displayed figure 92 to be laid over the target image 90, based on the size of the target object indicated by object-related information. Then, the output unit 190 can display the figure 92 over a target image with the determined positional relationship, orientation, and size.

In the image of FIG. 5, the figure (polygon) 92 based on selected object position information is displayed over the target image 90. In this screen, only one portion (inside of a predetermined range) of the target image 90 is displayed around the figure 92. Moreover, in the image of FIG. 5, a message promoting to move the figure 92 in such a way as to lay the figure 92 over a nearby target object (vessel) 91 included in the target image 90 is displayed. The message is a message promoting correction of object position information. However, a message promoting correction of object position information is not limited to being displayed on a display, and may be output from a speaker by sound.

FIG. 6 illustrates a scene of operation of a user. According to a message, a user moves, with a mouse or the like, the figure 92 in such a way as to lay the figure 92 over the nearby target object 91. An arrow in FIG. 6 illustrates a scene of moving the figure 92. The operation of moving corresponds to an operation of correcting object position information.

When completing the movement, the user presses a "next" button. In this instance, the correction data acquisition unit 170 acquires information indicating an amount (shift amount) and a direction (a direction of shift) in which the user has moved the figure 92, as correction data for the object position information.

When the "next" button is pressed, the output unit 190 displays, over the target image 90, the figure 92 corresponding to next object position information, as illustrated in FIG. 7. A method by which the output unit 190 displays the figure 92 over the target image 90 is the same as that described with FIG. 5. In the image of FIG. 7, a completion count (the number of pieces of object position information for which a correction operation has been completed) is increased by one as compared with a completion count illustrated in FIG. 5. Moreover, a statistical value (e.g. an average value or a median) of a shift amount and a direction of shift acquired for the target image 90 so far is indicated as each element of an xy vector.

In FIG. 7 as well, the user performs an operation of moving the figure 92 in such a way as to lay the figure 92 over the nearby target object 91.

When a predetermined number ("5" in the example of FIGS. 5 to 7) of pieces of correction data are acquired, processing for acquiring correction data ends. Alternatively, processing for acquiring correction data may end when the user presses an "end" button.

In this way, the correction data acquisition unit 170 can acquire, in order, correction data of object position information selected by the selection unit 150. When processing for acquiring correction data ends, the correction unit 180 determines a statistical value (e.g. an average value or a median) of the acquired correction data as application correction data to be applied to all pieces of object position information. The correction unit 180 can compute a statistical value by use of all pieces of correction data acquired for the target image 90.

As in FIGS. 5 to 7, when the output unit 190 displays the figures 92 one by one, and the correction data acquisition unit 170 acquires correction data, the output unit 190 preferably displays the figures 92 in descending order of reliability indicated by reliability information. In other words, the correction data acquisition unit 170 preferably acquires correction data in descending order of reliability indicated by reliability information.

Note that, although FIGS. 5 to 7 illustrate an example in which the output unit 190 displays the figures 92 one by one, the output unit 190 may not display the figures 92 one by one. In other words, when the selection unit 150 selects a plurality of pieces of object position information, the output unit 190 may simultaneously display two or more of the figures 92, or may simultaneously display all pieces of object position information selected by the selection unit 150. An order in which the user performs correction, i.e., an order in which the correction data acquisition unit 170 acquires correction data in not particularly limited.

Moreover, the output unit 190 may further display, over the target image 90, the figure 92 being associated with object position information that is not selected by the selection unit 150. In this case, the output unit 190 displays, in a distinguishable state, the figure 92 being associated with object position information selected by the selection unit 150, and the figure 92 being associated with object position information that is not selected by the selection unit 150. For example, the figure 92 being associated with object position information selected by the selection unit 150, and the figure 92 being associated with object position information that is not selected by the selection unit 150 are displayed in different colors. Then, for example, the output unit 190 outputs a message "Please move a red polygon in such a way as to lay the polygon over a nearby vessel.", and, thereby, correction of object position information selected by the selection unit 150 can be promoted.

In each of the examples described above, a positional relationship of each of the figures 92 with the target image 90 can be determined based on object position information being associated with the figure 92.

As described above, the correction unit 180 can compute application correction data by use of one or more pieces of correction data acquired by the correction data acquisition unit 170. Application correction data also indicate a shift amount and a direction of shift, similarly to correction data. Application correction data can be a vector indicating a shift amount and a direction of shift.

Then, the correction unit 180 corrects, based on application correction data, a plurality of object position information acquired by the acquisition unit 110. Specifically, the correction unit 180 shifts a position indicated by each piece of object position information in a direction of shift indicated by application correction data and in a shift amount indicated by the application correction data.

The correction unit 180 may correct, based on application correction data, all pieces of object position information acquired by the acquisition unit 110. In this case, for object position information on which the user has performed operation in order to acquire correction data, correction based on application correction data is also performed on object position information acquired by the acquisition unit 110, i.e. object position information before correction of the user. Alternatively, the correction unit 180 may correct, based on application correction data, only object position information on which the user has not performed an operation of correction for acquisition of correction data, i.e. object position information for which the correction data acquisition unit 170 has not acquired correction data. In this case, for object position information on which the user has performed an operation of correction for acquisition of correction data, the correction by the user is adopted as correction for the object position information.

The output unit 190 outputs one or more pieces of corrected object position information. The output unit 190 can output all pieces of corrected object position information in association with a target image. One or more pieces of corrected object position information can be handled as annotation information for the target image. Alternatively, one or more pieces of corrected object position information can be handled as initial data of annotation information. Note that, the output unit 190 may perform processing of removing, from a plurality of pieces of corrected object position information, object position information indicating a position that is out of a range of a target image. In this way, the output unit 190 may output only one or more pieces of corrected object position information indicating a position that is not out of a range of a target image.

The output unit 190 may output corrected object position information after converting the corrected object position information into positional information with respect to a target image. Moreover, the output unit 190 may further output, in association with object position information, information indicating a size and an orientation of a target object within a target image.

The output unit 190 holds, for example, corrected object position information in a post-correction information storage unit 105 in association with a target image. The post-correction information storage unit 105 may be included in the information processing apparatus 10, or may be provided outside the information processing apparatus 10. Alternatively, the output unit 190 may output corrected object position information to another apparatus.

As another example, the output unit 190 may display corrected object position information over a target image. Then, the correction data acquisition unit 170 may further accept correction (annotation) by the user. For example, even object position information corrected in the correction unit 180 can be still displaced from a position of a target object. Moreover, the user may additionally perform annotation regarding a target object for which the acquisition unit 110 has not acquired object position information, such as a target object that has not transmitted object information. After such work of the user, the output unit 190 may output object position information to the post-correction information storage unit 105 as annotation information. Even when the user finally performs the pieces of annotation work, efficiency of the whole annotation work heightens due to correction preliminary performed by the correction unit 180.

Note that, the correction data acquisition unit 170 may accept correction by the user following correction by the correction unit 180, or may read, at any timing according to an operation of the user, information temporarily stored in the post-correction information storage unit 105, and accept correction by the user.

A hardware configuration of the information processing apparatus 10 is described below. Each functional component (the acquisition unit 110, the generation unit 130, the selection unit 150, the correction data acquisition unit 170, the correction unit 180, and the output unit 190) of the information processing apparatus 10 may be achieved by hardware (example: a hard-wired electronic circuit, or the like) that achieves each functional configuration unit, or may be achieved by a combination of hardware and software (example: a combination of an electronic circuit and a program controlling the electronic circuit, or the like). A case where each functional configuration unit of the information processing apparatus 10 is achieved by a combination of hardware and software is further described below.

Figure 8:
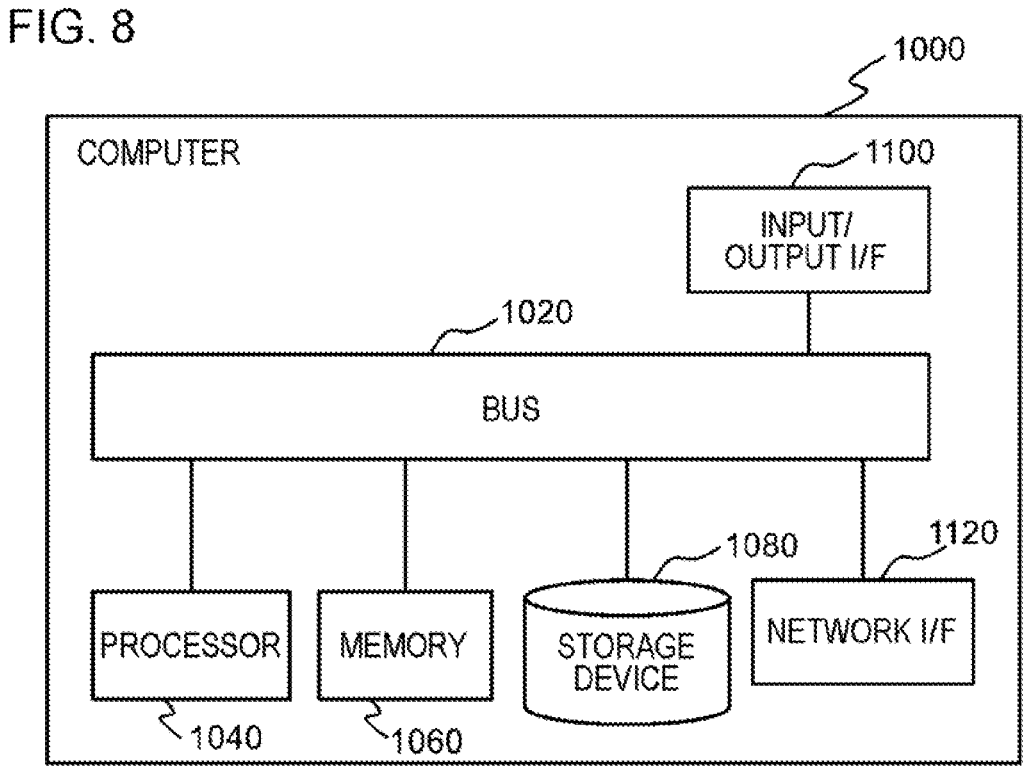
FIG. 8 is a diagram illustrating a computer for achieving an information processing apparatus.

FIG. 8 is a diagram illustrating a computer 1000 for achieving the information processing apparatus 10. The computer 1000 is any computer. For example, the computer 1000 is a system on chip (SoC), a personal computer (PC), a server machine, a tablet terminal, a smartphone, or the like. The computer 1000 may be a dedicated computer designed in order to achieve the information processing apparatus 10, or may be a general-purpose computer. Moreover, the information processing apparatus 10 may be achieved by one computer 1000, or may be achieved by a combination of a plurality of computers 1000.

The computer 1000 includes a bus 1020, a processor 1040, a memory 1060, the storage device 1080, an input/output interface 1100, and a network interface 1120. The bus 1020 is a data transmission path for the processor 1040, the memory 1060, the storage device 1080, the input/output interface 1100, and the network interface 1120 to mutually transmit and receive data. However, a way of connecting the processor 1040 and the like to each other is not limited to bus connection. The processor 1040 is a variety of processors such as a central processing unit (CPU), a graphics processing unit (GPU), or a field-programmable gate array (FPGA). The memory 1060 is a main storage apparatus achieved by use of a random access memory (RAM) and the like. The storage device 1080 is an auxiliary storage apparatus achieved by use of a hard disk, a solid state drive (SSD), a memory card, a read only memory (ROM), and the like.

The input/output interface 1100 is an interface for connecting the computer 1000 and an input/output device. For example, an input apparatus such as a keyboard, and an output apparatus such as a display are connected to the input/output interface 1100. A method in which the input/output interface 1100 is connected to the input apparatus and the output apparatus may be wireless connection, or may be wired connection.

The network interface 1120 is an interface for connecting the computer 1000 to a network. The communication network is, for example, a local area network (LAN) or a wide area network (WAN). A method in which the network interface 1120 is connected to a network may be wireless connection, or may be wired connection.

The output unit 190 can display an image or the like on a display connected to the computer 1000 via the input/output interface 1100 or the network interface 1120. Moreover, the output unit 190 can output sound to a speaker connected to the computer 1000 via the input/output interface 1100 or the network interface 1120.

The storage device 1080 stores a program module that achieves each functional configuration unit of the information processing apparatus 10. The processor 1040 reads each of the program modules onto the memory 1060, executes the read program module, and thereby achieves a function corresponding to each of the program modules.

When the image storage unit 101 is provided inside the information processing apparatus 10, for example, the image storage unit 101 is achieved by use of the storage device 1080. When the object information storage unit 103 is provided inside the information processing apparatus 10, for example, the object information storage unit 103 is achieved by use of the storage device 1080. When the post-correction information storage unit 105 is provided inside the information processing apparatus 10, for example, the post-correction information storage unit 105 is achieved by use of the storage device 1080.

Figure 9:
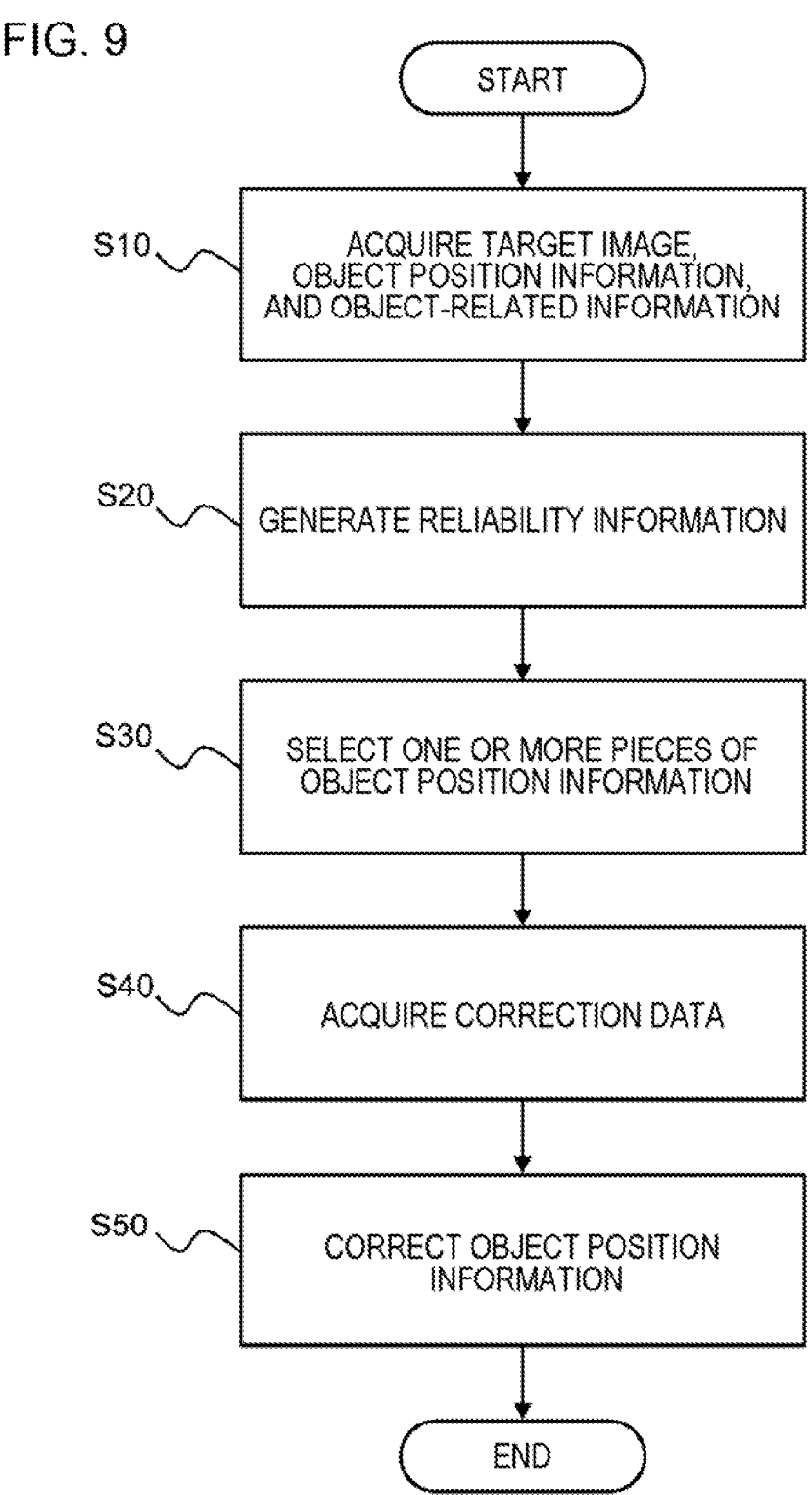
FIG. 9 is a diagram illustrating an outline of an information processing method according to the first example embodiment.

FIG. 9 is a diagram illustrating an outline of an information processing method according to the present example embodiment. The information processing method according to the present example embodiment is executed by one or more computers. The information processing method according to the present example embodiment includes steps S10, S20, S30, S40, and S50. In step S10, one or more computers acquire a target image including a plurality of target objects, object position information, and object-related information. The object position information to be acquired by one or more computers is information being information indicating a position of each of the plurality of target objects, and is information being selected by use of an image capturing time of the target image. The object-related information to be acquired by one or more computers includes at least one of a generation time of the object position information and a speed of the target object. In step S20, one or more computers generate reliability information of the object position information by use of at least the object-related information. In step S30, one or more computers select one or more pieces of the object position information by use of the reliability information among a plurality of pieces of the acquired object position information. In step S40, one or more computers acquire correction data of the object position information regarding each of the one or more pieces of the selected object position information. In step S50, one or more computers correct the plurality of pieces of object position information by use of one or more pieces of the acquired correction data.

The information processing method according to the present example embodiment is achieved by the information processing apparatus 10 according to the present example embodiment.

As described above, according to the present example embodiment, the correction unit 180 corrects a plurality of pieces of object position information by use of one or more pieces of acquired correction data. Therefore, annotation information with high accuracy can be easily acquired.

Modified Example 1

Modified Example 1 is a modified example of the first example embodiment. An information processing apparatus 10, an information processing method, and a program according to Modified Example 1 are the same as the information processing apparatus 10, the information processing method, and the program according to the first example embodiment, respectively, except for a generation method of reliability information.

In the present modified example, object-related information includes a generation time $T_i$ of object position information $P_i$, and a generation unit 130 generates reliability information by use of the generation time $T_i$ of the object position information $P_i$. The generation unit 130 according to the present modified example does not need to use a speed $S_i$ for generation of reliability information. An acquisition unit 110 according to the present modified example further acquires an image capturing time $T_{img}$ of a target image. The acquisition unit 110 can acquire, in addition to a target image (e.g. as meta data of the target image), the image capturing time $T_{img}$ being associated with the target image, from an image storage unit 101, another apparatus, or the like.

The generation unit 130 according to the present modified example computes, as reliability information, a reliability degree $c_{.i}$ (i=1, 2, . . . , n) relating to a plurality of pieces of object position information $P_i$ (i=1, 2, . . . , n), by use of, for example, Equation (2).

[Mathematical 2]

$$c_i = \frac{1}{1 + |T_i - T_{img}|} \tag{2}$$

In other words, the generation unit 130 according to the present modified example generates reliability information for the object position information $P_i$ by use of the generation time $T_i$ of the object position information $P_i$. Specifically, the generation unit 130 according to the present modified example generates reliability information regarding the object position information $P_i$, by use of the generation time $T_i$ of the object position information $P_i$ and the image capturing time $T_{img}$ of a target image.

According to Equation (2), as a difference between the generation time $T_i$ and the image capturing time $T_{img}$ is smaller, the greater reliability degree $c_{.i}$ is acquired.

Note that, the generation unit 130 may generate reliability information by use of a mathematical expression different from Equation (2) or a rule. However, the generation unit 130 preferably generates reliability information in such a way that reliability becomes higher as the generation time $T_i$ is closer to the image capturing time $T_{img}$. In other words, when the generation time $T_i$ is coincident with the image capturing time $T_{img}$, a reliability degree of the object position information $P_i$ becomes the highest. The image capturing time $T_{img}$ of a target image is not necessarily the same as the generation time $T_i$ of the object position information $P_i$. It is because, herein, a possibility that a target object is at a position indicated by the object position information $P_i$ at the image capturing time $T_{img}$ of a target image is estimated to be higher as the generation time $T_i$ is closer to the image capturing time $T_{img}$.

Next, an action and an advantageous effect according to the present modified example are described. In the present modified example, an action and an advantageous effect similar to the first example embodiment are acquired.

Second Example Embodiment

An information processing apparatus 10, an information processing method, and a program according to a second example embodiment are the same as the information processing apparatus 10, the information processing method, and the program according to at least one of the first example embodiment and Modified Example 1, respectively, except for points described below. Object-related information according to the present example embodiment includes both a generation time $T_i$ of object position information $P_i$ and a speed $S_i$ of a target object i. An acquisition unit 110 according to the present example embodiment further acquires an image capturing time $T_{img}$ of a target image. Then, the generation unit 130 generates reliability information by use of the generation time $T_i$ of the object position information $P_i$, the speed $S_i$ of the target object i, and the image capturing time $T_{img}$ of a target image.

The acquisition unit 110 according to the present example embodiment can acquire the image capturing time $T_{img}$ of a target image similarly to the acquisition unit 110 according to Modified Example 1.

The generation unit 130 according to the present modified example computes, as reliability information, a reliability degree $c._i$ (i=1, 2, . . . , n) relating to a plurality of pieces of object position information $P_i$ (i=1, 2, . . . , n), by use of, for example, Equation (3).

[Mathematical 3]

$$c_i = \frac{1}{1 + |T_i - T_{img}| \times S_i} \tag{3}$$

By using Equation (3), the reliability degree $c._i$ can be computed based on a difference between the generation time $T_i$ of the object position information $P_i$ and the image capturing time $T_{img}$ of a target image. Moreover, by using Equation (3), the reliability degree $c._i$ can be computed based on a result acquired by multiplying a difference between the generation time $T_i$ of the object position information $P_i$ and the image capturing time $T_{img}$ of a target image by the speed $S_i$. By using Equation (3), the greater $c_i$ is acquired, as a difference between the generation time $T_i$ and the image capturing time $T_{img}$ is smaller. Besides, the greater reliability degree $c._i$ is acquired as the speed $S_i$ is slower.

Note that, the generation unit 130 may generate reliability information by use of a mathematical expression different from Equation (3) or a rule. However, the generation unit 130 preferably generates reliability information in such a way that reliability becomes higher as the generation time $T_i$ is closer to the image capturing time $T_{img}$. Besides, the generation unit 130 preferably generates reliability information in such a way that reliability becomes higher as the speed $S_i$ is slower.

Next, an action and an advantageous effect according to the present modified example are described. In the present modified example, an action and an advantageous effect similar to those according to at least one of the first example embodiment and Modified Example 1 are acquired. In addition, according to the present example embodiment, the generation unit 130 generates reliability information by use of the generation time $T_i$ of the object position information $P_i$, the speed $S_i$ of the target object i, and the image capturing time $T_{img}$ of a target image. Therefore, reliability information with higher accuracy can be generated.

Third Example Embodiment

An information processing apparatus 10, an information processing method, and a program according to a third example embodiment are the same as the information processing apparatus 10, the information processing method, and the program according to at least one of the first example embodiment, the second example embodiment, and Modified Example 1, respectively, except for points described below.

In the present example embodiment, a target image is a satellite image, and is an SAR image. Then, a generation unit 130 according to the present example embodiment generates reliability information by use of a shift amount of an azimuth shift in a target image.

Figure 10:
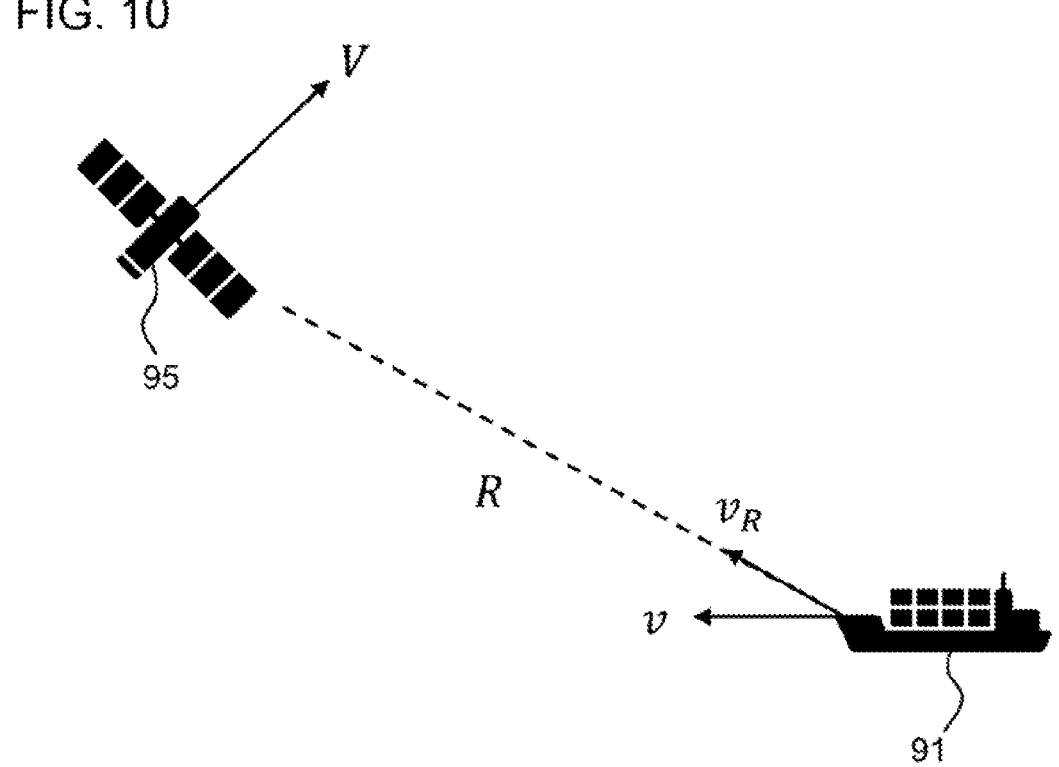
FIG. 10 is a diagram for describing an azimuth shift.

FIG. 10 is a diagram for describing an azimuth shift. An SAR image is captured in such a way that a position of a target object 91 is displaced in proportion to relative velocities between the target object 91 and a satellite 95. This displacement is referred to as an azimuth shift. A shift amount $\Delta X$ of an azimuth shift is represented by Equation (4). Herein, V is a velocity of the satellite 95 that captures an SAR image. R is a distance between the satellite 95 that captures an SAR image, and the target object 91. $v_R$ is a velocity of the target object 91 in a satellite direction. The satellite direction is a direction from the target object 91 toward the satellite 95 that captures an SAR image. Moreover, in FIG. 10, v is a velocity of the target object 91.

[Mathematical 4]

$$\Delta X = -\frac{R v_R}{V} \tag{4}$$

With a target image, a velocity V of a satellite when the target image is captured, and information indicating a position of the satellite when the target image is captured are associated as, for example, meta data. An acquisition unit 110 according to the present example embodiment can acquire, in addition to a target image, the velocity V of a satellite being associated with the target image from an image storage unit 101, another apparatus, or the like. Moreover, the acquisition unit 110 according to the present example embodiment can acquire, in addition to a target image, positional information of a satellite being associated with the target image from an image storage unit 101, another apparatus, or the like.

The generation unit 130 according to the present example embodiment can compute, for each piece of object position information, the distance R between a satellite and a target object by use of a position indicated by the object position information, and positional information of a satellite. Moreover, the generation unit 130 can compute the velocity $v_R$ for each piece of object position information, by use of a position indicated by the object position information, positional information of a satellite, a movement direction of a target object, and the velocity v of the target object. The movement direction of the target object is included in, for example, object-related information. The acquisition unit 110 according to the present example embodiment can acquire, from the object information storage unit 103, for example, information indicating a movement direction being associated with object position information. The information indicating a movement direction is included in, for example, object-related information.

The generation unit 130 computes the shift amount $\Delta X$, by use of the velocity V acquired by the acquisition unit 110, the distance R and the velocity $v_R$ computed by the generation unit 130, and Equation (4).

Then, the generation unit 130 computes, as reliability information, a reliability degree $c_{.i}$ (i=1, 2, . . . , n) relating to a plurality of pieces of object position information $P_i$ (i=1, 2, . . . , n), by use of Equation (5).

[Mathematical 5]

$$c_i = \frac{1}{1 + |T_i - T_{img}| \times S_i + \Delta X_i} \tag{5}$$

The reliability degree $c_{.i}$ can be computed based on the shift amount $\Delta X$, by using Equation (5). Moreover, by using Equation (5), the greater reliability degree $c_{.i}$ is acquired as the shift amount $\Delta X$ is smaller.

In Equation (5), the reliability degree $c_{.i}$ is computed further based on a generation time $T_i$ of the object position information $P_i$, an image capturing time $T_{img}$ of a target image, and a speed $S_i$. However, the generation unit 130 according to the present example embodiment may generate reliability information by use of a mathematical expression different from Equation (5) or a rule. For example, the generation unit 130 according to the present example embodiment may generate reliability information without using the generation time $T_i$ of the object position information $P_i$ and the image capturing time $T_{img}$ of a target image, or may generate reliability information without using the speed $S_i$ other than for computation of the shift amount $\Delta X$. Specifically, the generation unit 130 may compute the reliability degree $c_{.i}$ by use of a mathematical expression obtained by substituting $|T_i-T_{img}|=1$ into Equation (5). Moreover, the generation unit 130 may compute the reliability degree $c_{.i}$ by use of a mathematical expression obtained by substituting $S_i=1$ into Equation (5). The generation unit 130 may compute the reliability degree $c_{.i}$ by use of a mathematical expression obtained by substituting $|T_i-T_{img}|\times S_i=0$ into Equation (5).

Next, an action and an advantageous effect according to the present example embodiment are described. In the present example embodiment, an action and an advantageous effect similar to those according to at least one of the first example embodiment, the second example embodiment, and Modified Example 1 are acquired. In addition, according to the present example embodiment, the generation unit 130 generates reliability information by use of a shift amount of an azimuth shift in a target image. Therefore, reliability information with higher accuracy in which an influence of an azimuth shift is taken into consideration can be generated.

Fourth Example Embodiment

An information processing apparatus 10, an information processing method, and a program according to a fourth example embodiment are the same as the information processing apparatus 10, the information processing method, and the program according to at least one of the first to third example embodiments and Modified Example 1, respectively, except for points described below.

In the present example embodiment, object-related information further includes a size of a target object. Then, a generation unit 130 according to the present example embodiment generates reliability information by use of a size of a target object.

Figure 11:
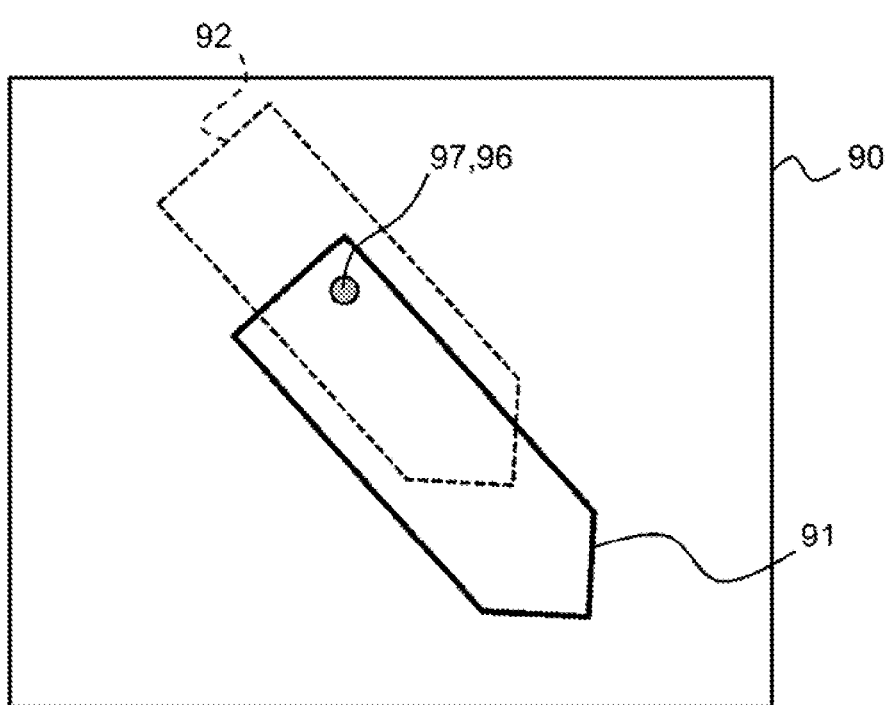
FIG. 11 is a diagram illustrating a relationship between a measurement position of object position information and a position of a target object.

FIG. 11 is a diagram illustrating a relationship between a measurement position of object position information and a position of a target object. For example, an output unit 190 associates a predetermined criterion position (e.g. a center or a center of gravity) of a figure 92 with a position indicated by object position information, when a positional relationship between a target image 90 and the figure 92 is determined. However, a position of a measurement apparatus (e.g. a transmission and reception apparatus of an electric wave) actually measuring a position in the target object 91 is not necessarily coincident with criterion position. In the example of FIG. 11, a measurement apparatus 96 is provided near a stern left side of a target object 91. A position indicated by object position information is a position of the measurement apparatus 96. In contrast, when the figure 92 is laid over the target image 90 in such a way as to associate a center of gravity 97 of the figure 92 with a position indicated by object position information, the target object 91 on the target image 90 is displaced relative to the figure 92 as illustrated in FIG. 11. Then, such displacement can become greater as the target object 91 is larger. Therefore, it can be said that, as the target object 91 is smaller, reliability of object position information of the target object 91 is higher.

An acquisition unit 110 further acquires a size of the target object. A size of a target object is included in object-related information, and is associated with object position information of the target object. Note that, a size of a target object may be information transmitted from the target object, or may not be information transmitted from the target object. For example, when reference data associating identification information with a size are previously held in a storage apparatus, a size of a target object may be determined based on the identification information transmitted from the target object and the reference data. The determined size is associated with object position information of the target object. Note that, determination of a size based on identification information and reference data may be performed by the acquisition unit 110 of the information processing apparatus 10, or may be previously performed by another apparatus.

A size of the target object i includes, for example, a length Li of the target object i, and a breadth Bi of a direction perpendicular to a direction of the length Li.

The generation unit 130 according to the present example embodiment computes, as reliability information, a reliability degree $c_{.i}$ (i=1, 2, . . . , n) relating to a plurality of pieces of object position information $P_i$ (i=1, 2, . . . , n), by use of Equation (6).

[Mathematical 6]

$$c_i = \frac{1}{1 + |T_i - T_{img}| \times S_i + \dfrac{\sqrt{L_i^2 + B_i^2}}{2}} \quad (6)$$

The reliability degree $c_{\cdot i}$ can be computed based on a size of the target object i, by using Equation (6). Moreover, by using Equation (6), the greater reliability degree $c_{\cdot i}$ is acquired as a size of the target object i is smaller.

In Equation (6), the reliability degree $c_{\cdot i}$ is computed further based on a generation time $T_i$ of the object position information $P_i$, an image capturing time $T_{img}$ of a target image, and a speed $S_i$. However, the generation unit 130 according to the present example embodiment may generate reliability information by use of a mathematical expression different from Equation (6) or a rule. For example, the generation unit 130 according to the present example embodiment may generate reliability information without using the generation time $T_i$ of the object position information $P_i$ and the image capturing time $T_{img}$ of a target image, or may generate reliability information without using the speed $S_i$. Specifically, the generation unit 130 may compute the reliability degree $c_{\cdot i}$ by use of a mathematical expression obtained by substituting $|T_i - T_{img}| = 1$ into Equation (6). Moreover, the generation unit 130 may compute the reliability degree $c_{\cdot i}$ by use of a mathematical expression obtained by substituting $S_i = 1$ into Equation (6). The generation unit 130 may compute the reliability degree $c_{\cdot 1}$ by use of a mathematical expression obtained by substituting $|T_i - T_{img}| \times S_i = 0$ into Equation (6). Further, the generation unit 130 may compute the reliability degree $c_{\cdot i}$ by use of the shift amount $\Delta X$ described in the third example embodiment.

In the present modified example, an action and an advantageous effect similar to those according to at least one of the first to third example embodiments and Modified Example 1 are acquired. In addition, according to the present example embodiment, the generation unit 130 generates reliability information by use of a size of a target object. Therefore, reliability information with higher accuracy in which an influence of a size of a target object is taken into consideration can be generated.

Fifth Example Embodiment

An information processing apparatus 10, an information processing method, and a program according to a fifth example embodiment are the same as the information processing apparatus 10, the information processing method, and the program according to the fourth example embodiment, respectively, except for points described below.

In the present example embodiment, a target object is a vessel. Object-related information further includes information indicating a vessel type of the target object. Then, a generation unit 130 according to the present example embodiment generates reliability information by use of the information indicating the vessel type of the target object.

Various vessel types of vessels exist. Then, a position of a measurement apparatus 96 is fixed to a certain degree for each vessel type. Therefore, a degree of displacement between a figure 92 described with reference to FIG. 11 and a target object 91 on a target image 90 can be estimated based on a vessel type of a target object.

Although a vessel type is not particularly limited, examples of vessel types include a pleasure boat, a tanker, a ferry, and a container vessel. Information indicating a vessel type is, for example, a vessel type code.

An acquisition unit 110 further acquires information indicating a vessel type of a target object. The information indicating the vessel type of the target object is included in object-related information, and is associated with object position information of the target object. Note that, information indicating a vessel type of a target object may be information transmitted from the target object, or may not be information transmitted from the target object. For example, when reference data associating identification information of a target object with information indicating a vessel type are previously held in a storage apparatus, a vessel type of the target object may be determined based on the identification information transmitted from the target object and the reference data. Information indicating the determined vessel type is associated with object position information of the target object. Note that, determination of a vessel type based on identification information and reference data may be performed by the acquisition unit 110 of the information processing apparatus 10, or may be previously performed by another apparatus.

The generation unit 130 according to the present example embodiment computes, as reliability information, a reliability degree $c_{\cdot i}$ (i=1, 2, . . . , n) relating to a plurality of pieces of object position information $P_i$ (i=1, 2, . . . , n), by use of Equation (7).

[Mathematical 7]

$$c_i = \frac{1}{1 + |T_i - T_{img}| \times S_i + \dfrac{\sqrt{L_i^2 + B_i^2}}{2} \times LUT(\tau_i)} \quad (7)$$

Herein, $\tau_i$ is information indicating a vessel type of a target object i. Then, LUT(•) is a parameter determined with $\tau_i$ as an argument. Parameter information indicating a relationship between $\tau_i$ and LUT($\tau_i$) is previously prepared, and held in a storage apparatus accessible from the generation unit 130. The parameter information is, for example, a table. The generation unit 130 determines LUT($\tau_i$) by use of the information $\tau_i$ indicating a vessel type acquired by the acquisition unit 110, and the parameter information. Then, the reliability degree $c_{\cdot i}$ can be computed by use of the determined LUT($\tau_i$).

By using Equation (7), the reliability degree $c_{\cdot i}$ can be computed based on the information $\tau_i$ indicating a vessel type of the target object i. For example, parameter information is prepared in such a way that for a vessel type in which the measurement apparatus 96 is provided nearer to a criterion position (e.g. a center or a center of gravity) of a vessel, the smaller LUT($\tau_i$) is acquired. Therefore, for a vessel type in which the measurement apparatus 96 is provided nearer to a criterion position (e.g. a center or a center of gravity) of a vessel, the greater reliability degree $c_{\cdot i}$ is acquired.

In Equation (7), the reliability degree $c_{\cdot i}$ is computed based on a value acquired by multiplying LUT($\tau_i$) and a value based on a size of the target object i. In Equation (7), the reliability degree $c_{\cdot i}$ is computed further based on a generation time $T_i$ of the object position information $P_i$, an image capturing time $T_{img}$ of a target image, and a speed $S_i$. However, the generation unit 130 according to the present example embodiment may generate reliability information by use of a mathematical expression different from Equation (7) or a rule. For example, the generation unit 130 according to the present example embodiment may generate reliability information without using the generation time $T_i$ of the object position information $P_i$ and the image capturing time $T_{img}$ of a target image, or may generate reliability information without using the speed $S_i$. Specifically, the generation unit 130 may compute the reliability degree $c_{\cdot i}$ by use of a mathematical expression obtained by substituting $|T_i-T_{img}|=1$ into Equation (7). Moreover, the generation unit 130 may compute the reliability degree $c_{\cdot i}$ by use of a mathematical expression obtained by substituting $S_i=1$ into Equation (7). The generation unit 130 may compute the reliability degree $c_{\cdot i}$ by use of a mathematical expression obtained by substituting $|T_i-T_{img}|\times S_i=0$ into Equation (7). Further, the generation unit 130 may compute the reliability degree $c_{\cdot i}$ by use of the shift amount $\Delta X$ described in the third example embodiment.

Next, an action and an advantageous effect according to the present modified example are described. In the present modified example, an action and an advantageous effect similar to those according to the fourth example embodiment are acquired. In addition, according to the present example embodiment, the generation unit 130 generates reliability information by use of information indicating a vessel type of a target object. Therefore, reliability information with higher accuracy in which an influence of a vessel type of a target object is taken into consideration can be generated.

Sixth Example Embodiment

Figure 12:
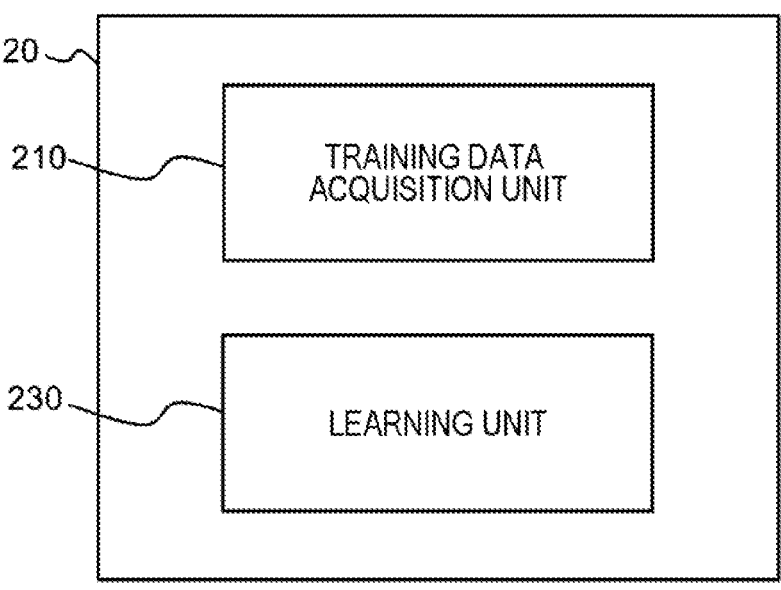
FIG. 12 is a diagram illustrating an outline of a model generation apparatus according to a sixth example embodiment.

FIG. 12 is a diagram illustrating an outline of a model generation apparatus 20 according to a sixth example embodiment. The model generation apparatus 20 according to the present example embodiment includes a training data acquisition unit 210 and a learning unit 230. The training data acquisition unit 210 acquires, as training data, a combination of a target image, and correct answer data generated by use of a plurality of pieces of corrected object position information, by an information processing method according to at least one of the first to fifth example embodiments and Modified Example 1. The learning unit 230 generates a detection model by performing machine learning by use of training data.

Correct answer data included in training data acquired by the training data acquisition unit 210 are, for example, annotation information described in the first example embodiment. Correct answer data may be exactly a plurality of pieces of object position information corrected by a correction unit 180 of an information processing apparatus 10, or may be data acquired by further performing a correction operation or the like by a user on a plurality of pieces of object position information corrected by a correction unit 180.

The training data acquisition unit 210 may acquire training data directly from the information processing apparatus 10, or may read and acquire training data held in a storage unit such as a post-correction information storage unit 105. It is preferable that the training data acquisition unit 210 acquires a plurality of pieces of training data, and the learning unit 230 performs machine learning by use of the plurality of pieces of training data.

A detection model generated by the model generation apparatus 20 includes a neural network. A detection model generated by the model generation apparatus 20 takes, for example, an image as input. Input of a detection model is, for example, a satellite image, similarly to a target image. Moreover, input of a detection model is, for example, an optical image or an SAR image, similarly to a target image. Output of a detection model includes, for example, information indicating a position of one or more target objects within an image. Output of a detection model may further include information indicating a size of each target object. Output of a detection model may further include information indicating an orientation of each target object.

A hardware configuration of a computer that achieves the model generation apparatus 20 is represented by, for example, FIG. 8, similarly to the information processing apparatus 10. However, a program module that achieves functions of the training data acquisition unit 210 and the learning unit 230 according to the present example embodiment is stored in a storage device 1080 of a computer 1000 that achieves the model generation apparatus 20 according to the present example embodiment. The computer that achieves the model generation apparatus 20 may also serve as a computer that achieves the information processing apparatus 10. The model generation apparatus 20 may be achieved by one computer 1000, or may be achieved by a combination of a plurality of computers 1000.

Figure 13:
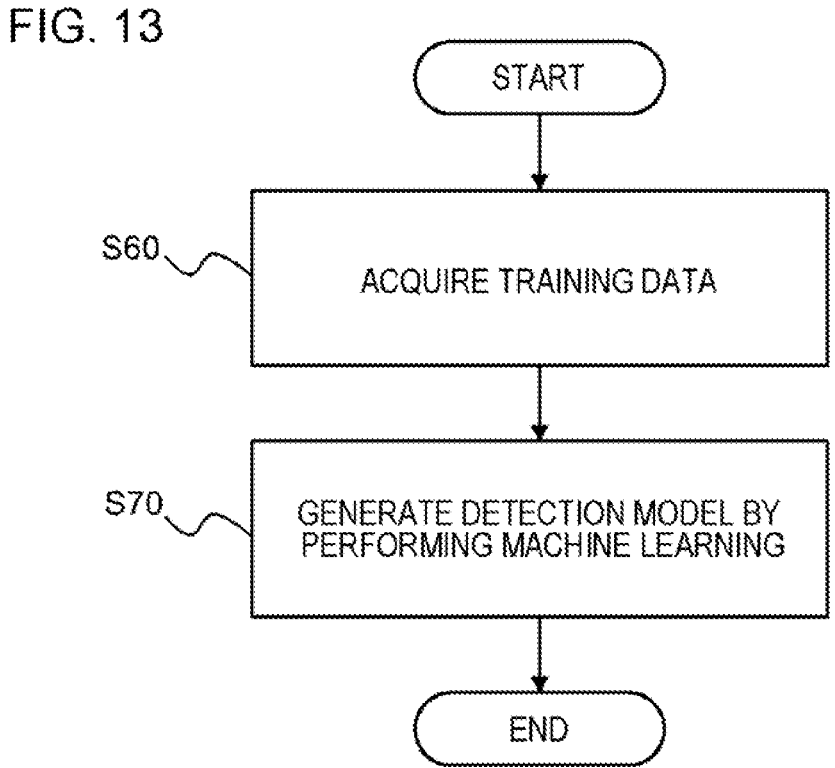
FIG. 13 is a diagram illustrating an outline of a model generation method according to the sixth example embodiment.

FIG. 13 is a diagram illustrating an outline of a model generation method according to the present example embodiment. The model generation method according to the present example embodiment is executed by one or more computers. The model generation method according to the present example embodiment includes steps S60 and S70. In step S60, one or more computers acquires, as training data, a combination of a target image, and correct answer data generated by use of a plurality of pieces of object position information corrected by an information processing method according to at least one of the first to fifth example embodiments and Modified Example 1. In step S70, one or more computers generate a detection model by performing machine learning by use of training data.

According to the present example embodiment, the training data acquisition unit 210 acquires, as training data, a combination of a target image, and correct answer data generated by use of a plurality of pieces of object position information corrected by an information processing method according to at least one of the first to fifth example embodiments and Modified Example 1. Therefore, a detection model can be easily generated.

The example embodiments and the modified example of the present invention have been described above with reference to the drawings, but are exemplifications of the present invention, and various configurations other than those described above can also be adopted.

Moreover, although a plurality of processes (pieces of processing) are described in order in a plurality of flowcharts used in the above description, an execution order of the processes executed in each of the example embodiments and the modified example is not limited to the described order. In each of the example embodiments and the modified example, an order of the illustrated processes can be changed to an extent that causes no problem in terms of content. Moreover, each of the example embodiments and the modified example described above can be combined to an extent that content does not contradict.

Some or all of the above-described example embodiments can also be described as, but are not limited to, the following supplementary notes.

1-1. An information processing apparatus including:

an acquisition unit that acquires a target image including a plurality of target objects, object position information being information indicating a position of each of the plurality of target objects and being selected by use of an image capturing time of the target image, and object-related information including at least one of a generation time of the object position information and a speed of the target object;

a generation unit that generates reliability information of the object position information by use of at least the object-related information;

a selection unit that selects one or more pieces of the object position information by use of the reliability information among a plurality of pieces of the acquired object position information;

a correction data acquisition unit that acquires correction data of the object position information regarding each of the one or more pieces of the selected object position information; and a correction unit that corrects the plurality of the object position information by use of one or more pieces of the acquired correction data.

1-2. The information processing apparatus according to supplementary note 1-1, further including an output unit that displays a figure illustrating the object position information over the target image.

1-3. The information processing apparatus according to supplementary note 1-2, wherein regarding the one or more pieces of the selected object position information, the output unit displays the figure illustrating the target object over the target image by use of the object position information, and performs output for promoting correction of the object position information, and the correction data acquisition unit acquires the correction data, based on correction performed according to the output for promoting the correction.

1-4. The information processing apparatus according to any one of supplementary notes 1-1 to 1-3, wherein the object-related information includes both the generation time of the object position information and the speed of the target object, the acquisition unit further acquires the image capturing time of the target image, and the generation unit generates the reliability information by use of the generation time of the object position information, the speed of the target object, and the image capturing time of the target image.

1-5. The information processing apparatus according to any one of supplementary notes 1-1 to 1-4, wherein the target image is a satellite image, and is an SAR image, and the generation unit generates the reliability information by use of a shift amount of an azimuth shift in the target image.

1-6. The information processing apparatus according to any one of supplementary notes 1-1 to 1-5, wherein the object-related information further includes a size of the target object, and the generation unit generates the reliability information by use of the size of the target object.

1-7. The information processing apparatus according to any one of supplementary notes 1-1 to 1-6, wherein the target object is a vessel.

1-8. The information processing apparatus according to supplementary note 1-7, wherein the object-related information further includes information indicating a vessel type of the target object, and the generation unit generates the reliability information by use of the information indicating the vessel type of the target object.

2-1. An information processing method including, by one or more computers:

acquiring a target image including a plurality of target objects, object position information being information indicating a position of each of the plurality of target objects and being selected by use of an image capturing time of the target image and object-related information including at least one of a generation time of the object position information and a speed of the target object;

generating reliability information of the object position information by use of at least the object-related information;

selecting one or more pieces of the object position information by use of the reliability information among a plurality of pieces of the acquired object position information;

acquiring correction data of the object position information regarding each of the one or more pieces of the selected object position information; and correcting the plurality of the object position information by use of one or more pieces of the acquired correction data.

2-2. The information processing method according to supplementary note 2-1, further including by the one or more computers, displaying a figure illustrating the object position information over the target image.

2-3. The information processing method according to supplementary note 2-2, further including by the one or more computers, regarding the one or more pieces of the selected object position information, displaying the figure illustrating the target object over the target image by use of the object position information, and performing output for promoting correction of the object position information, and acquiring the correction data, based on correction performed according to the output for promoting the correction.

2-4. The information processing method according to any one of supplementary notes 2-2 to 2-3, wherein the object-related information includes both the generation time of the object position information and the speed of the target object, the information processing method further including by the one or more computers, further acquiring the image capturing time of the target image, and generating the reliability information by use of the generation time of the object position information, the speed of the target object, and the image capturing time of the target image.

2-5. The information processing method according to any one of supplementary notes 2-1 to 2-4, wherein the target image is a satellite image, and is an SAR image, the information processing method further including by the one or more computers, generating the reliability information by use of a shift amount of an azimuth shift in the target image.

2-6. The information processing method according to any one of supplementary notes 2-1 to 2-5, wherein the object-related information further includes a size of the target object,
the information processing method further including by the one or more computers, generating the reliability information by use of the size of the target object.

2-7. The information processing method according to any one of supplementary notes 2-1 to 2-6, wherein the target object is a vessel.

2-8. The information processing method according to supplementary note 2-7, wherein
the object-related information further includes information indicating a vessel type of the target object,
the information processing method further including by the one or more computers, generating the reliability information by use of the information indicating the vessel type of the target object.

3-1. A program causing a computer to function as:
an acquisition unit that acquires a target image including a plurality of target objects, object position information being information indicating a position of each of the plurality of target objects and being selected by use of an image capturing time of the target image, and object-related information including at least one of a generation time of the object position information and a speed of the target object;
a generation unit that generates reliability information of the object position information by use of at least the object-related information;
a selection unit that selects one or more pieces of the object position information by use of the reliability information among a plurality of pieces of the acquired object position information;
a correction data acquisition unit that acquires correction data of the object position information regarding each of the one or more pieces of the selected object position information; and
a correction unit that corrects the plurality of the object position information by use of one or more pieces of the acquired correction data.

3-2. The program according to supplementary note 3-1, causing the computer to further function as an output unit that displays a figure illustrating the object position information over the target image.

3-3. The program according to supplementary note 3-2, wherein
regarding the one or more pieces of the selected object position information, the output unit displays the figure illustrating the target object over the target image by use of the object position information, and performs output for promoting correction of the object position information, and
the correction data acquisition unit acquires the correction data, based on correction performed according to the output for promoting the correction.

3-4. The program according to any one of supplementary notes 3-1 to 3-3, wherein
the object-related information includes both the generation time of the object position information and the speed of the target object,
the acquisition unit further acquires the image capturing time of the target image, and
the generation unit generates the reliability information by use of the generation time of the object position information, the speed of the target object, and the image capturing time of the target image.

3-5. The program according to any one of supplementary notes 3-1 to 3-4, wherein
the target image is a satellite image, and is an SAR image, and
the generation unit generates the reliability information by use of a shift amount of an azimuth shift in the target image.

3-6. The program according to any one of supplementary notes 3-1 to 3-5, wherein
the object-related information further includes a size of the target object, and
the generation unit generates the reliability information by use of the size of the target object.

3-7. The program according to any one of supplementary notes 3-1 to 3-6, wherein
the target object is a vessel.

3-8. The program according to supplementary note 3-7, wherein
the object-related information further includes information indicating a vessel type of the target object, and
the generation unit generates the reliability information by use of the information indicating the vessel type of the target object.

4-1. A computer-readable storage medium storing the program according to any one of supplementary notes 3-1 to 3-8.

5-1. A model generation apparatus including:
a training data acquisition unit that acquires, as training data, a combination of the target image, and correct answer data generated by use of the plurality of pieces of the object position information corrected by the information processing method according to any one of supplementary notes 2-1 to 2-8; and
a learning unit that generates a detection model by performing machine learning by use of the training data.

6-1. A model generation method including, by one or more computers:
acquiring, as training data, a combination of the target image, and correct answer data generated by use of the plurality of pieces of the object position information corrected by the information processing method according to any one of supplementary notes 2-1 to 2-8; and
generating a detection model by performing machine learning by use of the training data.

7-1. A program causing a computer to function as:
a training data acquisition unit that acquires, as training data, a combination of the target image, and correct answer data generated by use of the plurality of pieces of the object position information corrected by the information processing method according to any one of supplementary notes 2-1 to 2-8; and
a learning unit that generates a detection model by performing machine learning by use of the training data.

8-1. A computer-readable storage medium storing the program according to supplementary notes 7-1.

The invention claimed is:
1. An information processing apparatus comprising:
at least one memory configured to store instructions; and
at least one processor configured to execute the instructions to perform operations comprising:
acquiring a target image including a plurality of target objects;

acquiring a plurality of pieces of object position information, the object position information indicating a position of each of the plurality of target objects, and the object position information being selected by use of an image capturing time of the target image;

acquiring object-related information including at least one of a generation time of the object position information and a speed of each target object of the plurality of target objects;

generating, for each piece of the plurality of pieces, reliability information of the object position information by use of the object-related information, the reliability information indicating a likelihood that a target object is located at the position indicated by the object position information at a time at which the target image is captured;

selecting one or more pieces among the plurality of pieces by use of the reliability information corresponding to each piece of the plurality of pieces;

displaying the target image with a figure corresponding to each of the one or more pieces;

based on the displaying of the target image with the figure corresponding to each of the one or more pieces, acquiring correction data from a user for each of the one or more pieces; and correcting the plurality of pieces of the object position information by use of the correction data.

2. The information processing apparatus according to claim 1, wherein the operations further comprise acquiring the image capturing time of the target image, the object-related information includes the generation time of the object position information and the speed of each target object of the plurality of target objects, and the generating, for each piece of the plurality of pieces, the reliability information comprises generating the reliability information by use of the generation time of the piece of the object position information, the speed of the target object, and the image capturing time of the target image.

3. The information processing apparatus according to claim 2, wherein generating the reliability information comprises generating the reliability information so that reliability indicated by the reliability information becomes higher as the generation time is closer to the image capturing time and so that the reliability becomes higher as the speed is slower.

4. The information processing apparatus according to claim 1, wherein the target image is a satellite image, the satellite image being an SAR image, and the generating, for each piece of the plurality of pieces, the reliability information comprises generating the reliability information by use of a shift amount of an azimuth shift in the target image.

5. The information processing apparatus according to claim 4, wherein generating the reliability information comprises generating the reliability information so that reliability indicated by the reliability information becomes higher as the shift amount is smaller.

6. The information processing apparatus according to claim 1, wherein the object-related information further includes a size of each target object of the plurality of target objects, and

the generating, for each piece of the plurality of pieces, the reliability information comprises generating the reliability information by use of the size of the target object.

7. The information processing apparatus according to claim 6, wherein the target object is a vessel.

8. The information processing apparatus according to claim 7, wherein the object-related information further includes information indicating a vessel type of each target object of the plurality of target objects, and generating, for each piece of the plurality of pieces, the reliability information comprises generating the reliability information by use of the information indicating the vessel type of the target object.

9. The information processing apparatus according to claim 6, wherein generating the reliability information comprises generating the reliability information so that reliability indicated by the reliability information becomes higher as the size of the target object is smaller.

10. The information processing apparatus according to claim 1, wherein selecting the one or more pieces of the object position information comprises selecting, in a descending order of reliability indicated by the reliability information, a predetermined number pieces of the object position information among the plurality of pieces of the object position information.

11. The information processing apparatus according to claim 1, wherein acquiring the plurality of pieces of the object position information comprises acquiring the plurality of pieces of the object position information generated without using the target image.

12. The information processing apparatus according to claim 1, wherein displaying the target image with a figure corresponding to each of the one or more pieces comprises displaying, in a distinguishable state over the target image, a figure being associated with a piece of the plurality of pieces of the object position information selected by use of the reliability information and a figure associated with a piece of the plurality of pieces of the object position information that is not selected by use of the reliability information.

13. The information processing apparatus according to claim 1, wherein the operations further comprise:

displaying the plurality of the corrected object position information over the target image after correcting the plurality of the object position information by use of the acquired correction data corresponding to the one or more pieces; and accepting correction for the plurality of the corrected object position information by the user.

14. An information processing method executed by one or more computers, the information processing method comprising:

acquiring a target image including a plurality of target objects;

acquiring a plurality of pieces of object position information, the object position information indicating a position of each of the plurality of target objects, and the object position information being selected by use of an image capturing time of the target image;

acquiring object-related information including at least one of a generation time of the object position information and a speed of each target object of the plurality of target objects;

generating, for each piece of the plurality of pieces, reliability information of the object position information by use of the object-related information, the reliability information indicating a likelihood that a target object is located at the position indicated by the object position information at a time at which the target image is captured;

selecting one or more pieces of plurality of pieces by use of the reliability information corresponding to each piece of the plurality of pieces;

displaying the target image with a figure corresponding to each of the one or more pieces;

based on the displaying of the target image with the figure corresponding to each of the one or more pieces, acquiring correction data from a user for; and correcting the plurality of pieces of the object position information by use of the correction data.

15. The information processing method according to claim 14, further comprising acquiring the image capturing time of the time of the target image, wherein the object-related information includes the generation time of the object position information and the speed of each target object of the plurality of target objects, and the generating, for each piece of the plurality of pieces, the reliability information comprises generating the reliability information by use of the generation time of the piece of the object position information, the speed of the target object, and the image capturing time of the target image.

16. A non-transitory storage medium storing a program causing a computer to execute an information processing method, the information processing method comprising:

acquiring a target image including a plurality of target objects;

acquiring a plurality of pieces of object position information, the object position information indicating a position of each of the plurality of target objects, and the object position information being selected by use of an image capturing time of the target image;

acquiring object-related information including at least one of a generation time of the object position information and a speed of each target object of the plurality of target objects;

generating, for each piece of the plurality of pieces, reliability information of the object position information by use of the object-related information, the reliability information indicating a likelihood that a target object is located at the position indicated by the object position information at a time at which the target image is captured;

selecting one or more pieces among the plurality of pieces by use of the reliability information corresponding to each piece of the plurality of pieces;

displaying the target image with a figure corresponding to each of the one or more pieces;

based on the displaying of the target image with the figure corresponding to each of the one or more pieces, acquiring correction data from a user for each of the one or more pieces; and correcting the plurality of pieces of the object position information by use of the acquired correction data.

* * * * *